United States Patent [19]
Fathauer

[11] 3,743,930
[45] July 3, 1973

[54] MOISTURE TESTER HAVING TEMPERATURE CONTROLLED VARIABLE TIME DELAY CIRCUIT

[75] Inventor: George H. Fathauer, Decatur, Ill.
[73] Assignee: Burrows Equipment Company, Evanston, Ill.
[22] Filed: Aug. 13, 1971
[21] Appl. No.: 171,574

[52] U.S. Cl. ............... 324/61 R, 73/362 AR, 328/3, 328/4
[51] Int. Cl. ............................................. G01r 27/26
[58] Field of Search ...................... 324/61 R, 61 QS, 324/61 QL, 65 R; 307/310; 328/3, 4; 73/362 AR

[56] References Cited
UNITED STATES PATENTS
3,492,508  1/1970  Wagener et al. ................. 307/310 X
3,068,404  12/1962  Moore et al. ..................... 324/65 R
3,141,129  7/1964  Dietert ............................. 324/65 R
2,553,603  5/1951  Peters ..................................... 328/3
3,371,231  2/1968  Burley ................................. 328/3 X

OTHER PUBLICATIONS

Reed, Differential Heat Detector, IBM Technical Disclosure Bulletin, May 1968, p. 1898.

Primary Examiner—Stanley T. Krawczewicz
Attorney—Theodore W. Anderson, James T. Wiliams et al.

[57] ABSTRACT

A time delay circuit for use with a grain moisture tester is disclosed including a differentiating circuit operative to delay the taking of a reading until the time rate of change of the output of a temperature sensing element falls below a predetermined value.

10 Claims, 5 Drawing Figures

Patented July 3, 1973
3,743,930
2 Sheets-Sheet 1
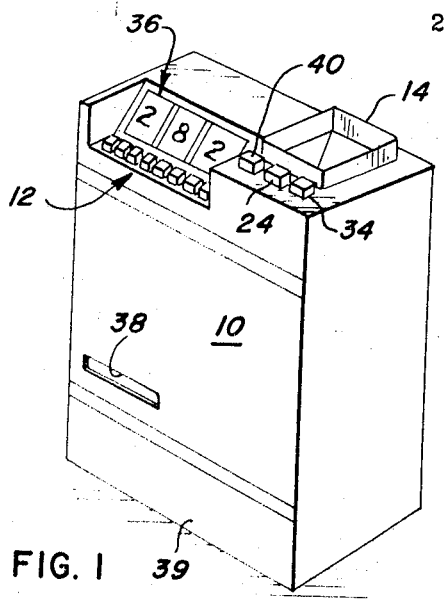
FIG. 1
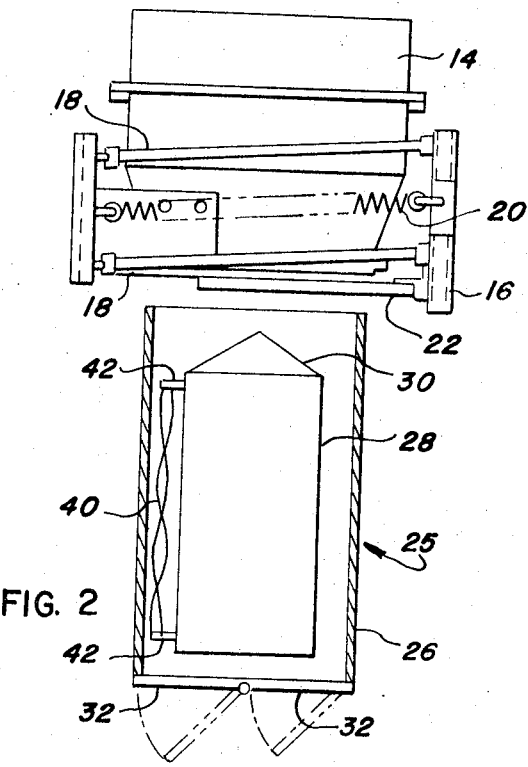
FIG. 2
FIG. 3
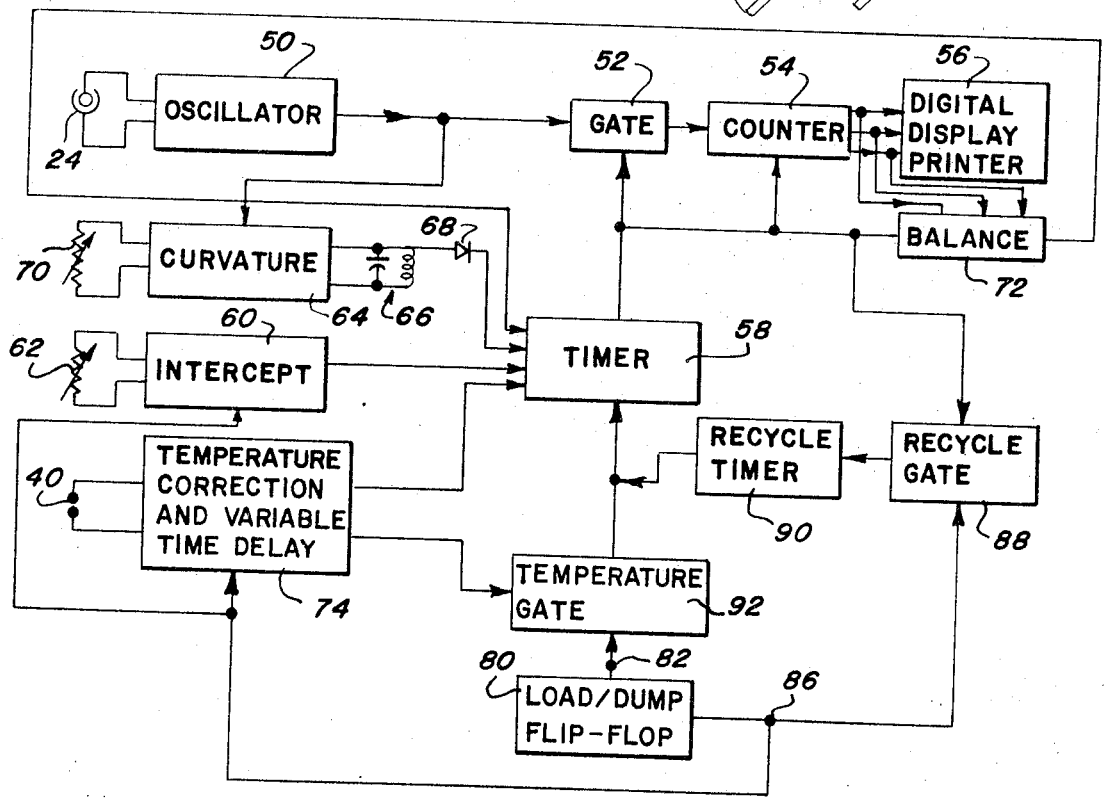

3,743,930

MOISTURE TESTER HAVING TEMPERATURE CONTROLLED VARIABLE TIME DELAY CIRCUIT

BACKGROUND OF THE INVENTION

This invention relates to time delay circuits and, in particular, to grain moisture testers including circuitry for delaying the taking of a measurement for a period related to the magnitude of the differential between the initial condition of a sensing device and the value of the parameter sensed by that device and, more particularly, to circuits in grain moisture testers for delaying the taking of a measurement related to a sensed condition until a measurement of that condition stabilizes with time, and, still more particularly, to circuits for use with grain moisture testers including a temperature correction circuit and delaying the taking of a measurement until the temperature sensing element has achieved a relatively steady state condition.

It has long been known that the moisture content of materials such as grains could be determined by measuring their dielectric constant. That measurement may conveniently be made by determining the relative capacitance of a cell containing a predetermined amount of the grain. However, it has also been known that the relationship between moisture content and dielectric constant for any particular type of grain is altered with changes in temperature of the grain under test.

Grain moisture testers have been proposed in the past which are capable of compensating for variations in the temperature of the grain sample under test. See, for example, U.S. Pat. No. 3,231,814 to D. F. Fathauer, et al., entitled "Apparatus For Measuring and Recording Capacitance Characteristics" which issued on Jan. 25, 1966. In the apparatus disclosed in that patent, the operator must wait a sufficient period of time so that he is certain the temperature responsive element has come to the temperature of the grain being tested before he takes a reading.

Another example of a grain moisture tester including temperature compensation is that disclosed in my co-pending application, Ser. No. 113,588, entitled "Digital Reading Moisture Tester", filed on Feb. 8, 1971. In the apparatus disclosed in that application, a fixed time delay is built into the circuit so that the taking of a measurement is delayed for a fixed period following the placement of the grain in the cell. The use of a fixed period has been found to have certain disadvantages. When there is a wide initial discrepancy between the temperature of the grain being tested and the temperature responsive element, it may take a considerable period of time for the temperature responsive element to come to the temperature of the grain. Such periods may, typically, be on the order of 10 to 20 seconds or more. An example of such a situation is when the grain has been stored outside in below zero temperatures and the tester is located inside a relatively warm building. However, when the temperatures of the grain and the temperature responsive element are initially within a few degrees, only a very short period of time is required for the temperature responsive element to come to the temperature of the grain. In order for the tester to provide accurate results over a broad range of temperature differentials, the fixed delay period must be relatively long. Thus, when the tester is in use, the delay period will most often be longer than that required for the temperature responsive element to come to the temperature of the grain, unnecessarily lengthening the time required to take a reading. Further, in cases of extreme temperature differentials, the delay period will not be sufficiently lengthy and inaccurate results will be obtained.

SUMMARY

This invention provides circuitry for use in a grain moisture tester and delaying the taking of a measurement relating to a sensed condition for a period related to the difference between the initial condition of the element sensing that condition and the value of the sensed condition and, more particularly, this invention provides circuitry for use in grain moisture testers having means to correct the reading given for the temperature of the grain under test and for delaying the taking of a measurement until the time rate of change of the output of the temperature responsive means falls below a predetermined value.

It is, thus, an object of this invention to provide circuitry in a grain moisture tester for delaying the taking of a measurement related to a sensed condition for a period related to the difference between the initial condition of the element sensing that condition and the value of the sensed condition.

It is an object of this invention to provide circuitry useful in grain moisture testers having temperature correction means wherein the taking of a measurement is delayed until the time rate of change of the temperature sensed by the temperature responsive means falls below a predetermined value.

It is an object of this invention to provide circuitry useful in grain moisture testers having means to correct for variations in the temperature of the grain under test and for adjusting the length of the time period between initiation of the test and the taking of the measurement depending on the differential between the temperature of the grain under test and the initial temperature of the temperature responsive element.

It is an object of this invention to provide an apparatus for measuring the moisture content of grains having provisions to adjust the measurement given in accord with the temperature of the grain under test and including a time delay circuit for delaying the taking of a temperature until the time rate of change of temperature sensed by a temperature responsive element falls below a predetermined value.

It is an object of this invention to provide a grain moisture tester having temperature correction means and a digital readout wherein no measurement is taken until the temperature sensed by a temperature responsive element achieves a relatively steady state condition.

It is an object of this invention to provide a variable time delay circuit fulfilling the above mentioned objects which is further characterized by simplicity of design, economy of construction, and ease of operation.

Further and additional objects will appear from the following description and drawings and the appended claims.

DESCRIPTION OF THE DRAWINGS

FIG. 1 is a perspective view of a moisture tester including one embodiment of this invention;

FIG. 2 is a partial, cutaway view of the moisture tester of FIG. 1 showing the hopper and scale mechanism, the grain cell, the grain dump mechanism, and the temperature responsive element in schematic form;

FIG. 3 is a partial block diagram of the circuitry included within the moisture tester of FIG. 1;

DESCRIPTION OF THE PREFERRED EMBODIMENT

Figure 4:
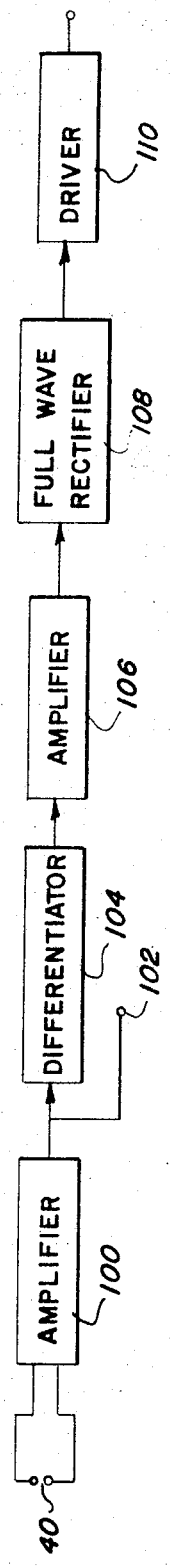
FIG. 4 is a block diagram of the temperature compensation and variable time delay circuitry included within the moisture tester of FIG. 1.

In the subsequent description, this invention will be described with relation to a particular variable time delay circuit as embodied in a certain digital reading, grain moisture tester. It will be obvious to those skilled in the art, however, that the invention is of much broader application and should not be restricted thereto.

The overall construction and operation of the moisture tester 10 disclosed in the accompanying drawing will first be described. Tester 10 includes a row of buttons 12 disposed on the face thereof. One button is a master power switch controlling the application of power to the tester circuitry and the remaining buttons are capable of selecting various circuit elements within the tester depending upon the type of grain being tested, depression of any one of those buttons corresponding to the testing of a single grain type.

A hopper 14 is disposed within the tester and extends through the top surface thereof to receive the grain sample to be tested. As may be seen from FIG. 2, the hopper is suspended from a bracket 16 fixedly attached to the main body of the moisture tester through a set of parallel bars 18 and springs 20, the suspension system shown being duplicated on the opposite side of the hopper. Bars 18 are capable of pivotal motion with respect to both hopper 14 and bracket 16, and springs 20 are located so as to draw the hopper upward. The hopper and spring system is preloaded and stops restraining its upward and downward travel are provided. When a given weight of material is placed within the hopper, it will swing between the two stops giving a positive indication of the correct weight. The hopper includes doors 22 pivotally mounted to the underside thereof which may be opened or closed as by operation of a button 24 mechanically linked thereto and located on the face of the tester. A similar hopper and scale system is disclosed in more detail in my copending application entitled "Sample Scale", Ser. No. 43,770, filed on June 5, 1970.

A grain cell 25 is disposed with the tester and beneath hopper 14. It comprises, in part, a hollow cylindrical, metallic outer electrode 26, shown in section in FIG. 2, and, coaxial therewith, a cylindrical, metallic inner electrode 28 topped by a conically shaped deflection plate 30. Deflection plate 30 insures that the grain sample released from hopper 14 will be relatively uniformly distributed throughout the annular volume between electrodes 26 and 28. The physical relationship between the electrodes is maintained by a structure of electrically insulating material, not shown.

Two dump doors 32 are pivotally mounted, and preferably spring loaded, to form the lower wall of the grain cell when in their closed position, as shown schematically in solid lines in FIG. 2. They may be mechanically linked to a button 34 on the face of the tester such that when the button is depressed, doors 32 open, as shown dashed in FIG. 2, and the grain in the cell released into a drawer 39 in the lower section of the tester. Drawer 39 may be removed at the completion of the test and the tested grain disposed of.

A ribbon type thermocouple 40 is disposed within cell 25. It may be comprised of two approximately equal length bands of dissimilar metal, usefully chromel and constantan, disposed end-to-end and joined together as by spotwelding, to form a single, elongate band. The thermocouple is placed within the cell for physical contact with the grain under test. It may be twisted about its longitudinal axis and suspended between two electrically insulated supports 42 attached to the cell inner electrode 28, as shown in FIG. 2.

The tester 10 additionally includes a digital readout unit 36 located on the face thereof for visually reading the percentage moisture content of the material tested. A digital printing unit may also be included within the tester, a slot 38 being provided on the front of the tester so that a card may be inserted therethrough and into the printer which, when actuated as by depressing a button 40 on the tester face, prints thereon the same figures as appear on digital display unit 36.

Turning now to the circuitry of the tester, FIG. 3 is a block diagram showing the major elements of the circuit included within the moisture tester of FIG. 1. Specifically, the circuit is comprised in part of an oscillator 50 which includes grain cell 24 used as a capacitive, frequency determining element. The oscillator output is coupled through a signal gate 52 to a digital counter 54 which counts the number of cycles of signal delivered to it from oscillator 50 through gate 52. The counter output, which may be on a plurality of lines, is coupled to the digital display and printing units indicated at block 56. A timer 58 is provided which yields at its output a series of pulses of predetermined period, the duration of which is dependent upon the magnitude of a plurality of input signals. Those timer pulses are applied to, first, a reset input to counter 54 to set an initial, reference count on the counter at the pulse onset, and, second, a control input of gate 52. The signal from oscillator 50 is thus applied to counter 54 only for the duration of the pulses from timer 58. If the duration of those timer pulses and the operating characteristics of oscillator 50 are known, the resultant count displayed on unit 56 may be used to determine the oscillator output frequency, the cell capacitance, the dielectric constant of the grain within the cell, and the moisture content of that grain.

As is well known, the relationship between dielectric constant and moisture content is different for different grains and, further, for any single grain varies with temperature. However, by properly adjusting the duration of the timer pulses, the relationship between the count obtained on counter 54 and the grain moisture content may be made the same no matter what grain is being tested or its temperature. The digital display and printer can also be constructed to give a direct reading of moisture content.

In the circuit of FIG. 3, four circuits are used to vary the period of the pulses originated by timer 58. Intercept circuit 60 produces a signal related to the intercept of a linear approximation to the relationship between the relative cell capacity of cell 24 and percent moisture content of the grain under test. The value of that signal may be adjusted for various grains by adjustment of a variable resistance element 62 associated with the intercept circuit. Curvature circuit 64 and its associated circuit elements produce a signal related to the deviation of oscillator 50 from a predetermined frequency. It has an input coupled to the output of oscillator 50 and includes a parallel resonant circuit 66 tuned to the predetermined frequency coupled across its output with a diode 68 coupled in series with an input to timer 58. The curvature circuit thus applies a d.c. signal to an input of timer 58 related to the deviation of the relationship between relative cell capacity and percent moisture content from the aforesaid linear approximation. A variable resistance element 70 is associated with curvature correction circuit 64 to permit variation in the magnitude of the d.c. signal in accord with the characteristics of different types of grain. A balance circuit 72 is coupled to the output of counter 54 and has an output coupled to an input of timer 58. It compensates for any changes which may occur in the operating characteristics of the tester circuit and, in particular, is part of a feedback circuit which insures that a predetermined count is achieved on counter 54 at the end of each timer pulse when no grain is present in cell 24. Finally, temperature correction and variable time delay circuit 74 of this invention provides at one output a signal related to the temperature of the grain within cell 24 which is applied to an input of timer 58. Thermocouple 40 is associated with the temperature circuit 74. The impedance of variable resistance elements 62 and 70 may be selected by push buttons 12.

The circuit of FIG. 3 also includes control circuitry for controlling the operation of the tester. Load/dump flip-flop 80 is a conventional set/reset flip-flop actuated by switches mechanically coupled to buttons 24 and 34 on the tester front panel. When button 24 is depressed loading grain into the cell, flip-flop 80 changes to a first stage and a flip-flop output 82 accordingly changes condition. That condition change is translated to timer 58 causing the timer to emit a timer pulse and operating the tester.

After the test is completed and the reading taken, button 34 is depressed and the grain dumped from the cell. Further, load/dump flip-flop changes to a second state and a second output 86 of flip-flop 80 accordingly changes condition and activates a recycle gate 88. Activation of the recycle gate 88 has two effects; it pulses timer 58 through a recycle timer 90 causing the timer to emit another pulse of predetermined period, and it holds recycle gate 88 open until flip-flop 80 again changes state. The output of timer 58 is coupled to an input of recycle gate 88. When recycle gate 88 is open, it receives the output pulses from timer 58 and, after a given period of delay provided by recycle timer 90, reactivates timer 58. Thus, as long as flip-flop 80 remains in its second state, the tester will continually be reactivated and will achieve a balance condition through the operation of balance circuit 72. Circuitry is also provided for disabling the intercept circuit 60 and the temperature correction circuit 74 when flip-flop 80 is put in its second or dump state and the tester is put in its balance mode. Circuitry must also be provided to disable balance circuit 72 when flip-flop 80 is put in its first or load state and the tester is put in its read mode.

As thus far described, the moisture tester of FIGS. 1—3 is very similar to that disclosed in my aforementioned application Ser. No. 113,588 filed on Feb. 8, 1971 and entitled "Digital Reading Moisture Tester".

Since a detailed understanding of the entire moisture tester circuitry is not required for understanding of the present invention, the operation of the circuit will not be further described.

However, in accord with the principles of this invention, temperature correction and variable time delay circuit 74 includes a second output which is bimodal. It assumes a first state when the time rate of change of the output of thermocouple 40 exceeds a predetermined value and a second state when the rate of change falls below that value. That bimodal output is used to operate a temperature gate circuit 92 which is interposed between the output of load/dump flip-flop 80 and the input to timer 58. It prevents translation of the change in condition of flip-flop output 82 to timer 58 when the flip-flop is placed in the read mode until the time rate of change of the output of thermocouple 40 falls below a predetermined value. Thus the tester is prevented from taking a reading until the thermocouple has come to a temperature relatively close to that of the grain in the cell.

A block diagram of the temperature correction and variable time delay circuit 74 is shown in FIG. 4. It includes an amplifier circuit 100 having the thermocouple 40 coupled to the input thereof and producing at an output terminal 102 a signal related to the temperature sensed by the thermocouple. The signal at terminal 102 may be applied to an input of timer 58 in FIG. 3. The output of amplifier 100 is also coupled to the input of a differentiator circuit 104 which produces at an output a signal related to the time derivative of the signal applied at its input. The output of the differentiator circuit 104 is amplified through amplifier 106 and, in turn, rectified by a full wave rectifier 108. The full wave rectifier insures that the time delay circuit will respond similarly to changes in the output of the thermocouple in both positive and negative directions. The rectifier output is applied to a driver 110 having a bimodal output depending on the magnitude of the rectifier output. The output of driver 110 is used to actuate the temperature gate 92 of FIG. 3. The temperature gate will thus be enabled only when the rate of change of the output of thermocouple 40 falls below a predetermined value.

Figure 5:
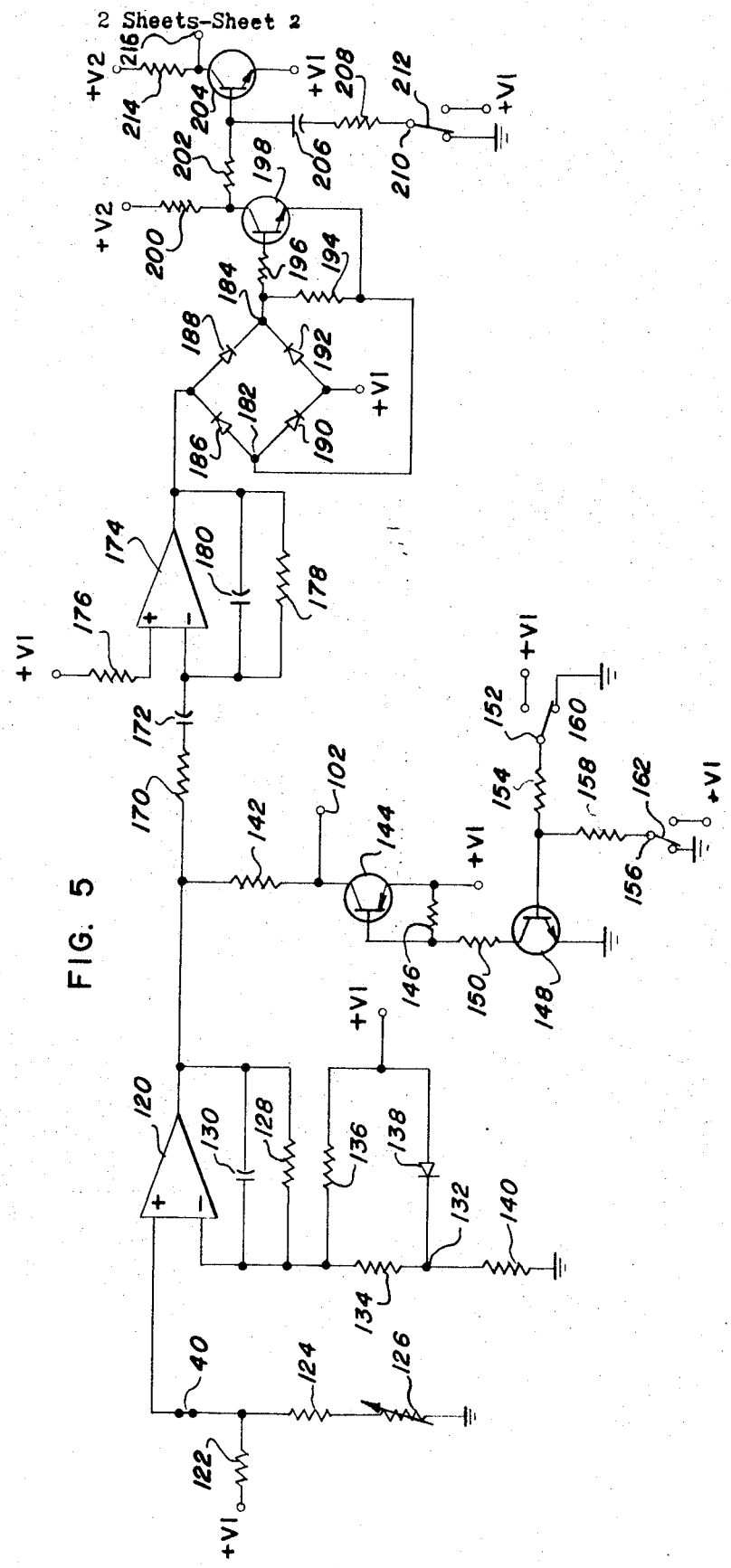
FIG. 5 is a schematic diagram of the temperature compensation and variable time delay circuitry of FIG. 4.

FIG. 5 is a schematic diagram of the circuit of FIG. 4. The constantan side of thermocouple 40 is connected to the positive input of a differential operational amplifier 120. The chromel side of the thermocouple is coupled first to a first positive voltage supply V1 through a resistor 122 and second to a circuit ground through the series combination of a fixed resistor 124 and a variable resistor 126. The negative input of operational amplifier 120 is coupled to the output of that amplifier through the parallel combination of resistor 128 and capacitor 130. The negative input of that amplifier is also coupled both to a circuit point 132 through a resistor 134 and to the first positive voltage supply V1 through resistor 136. A diode 138 couples first positive supply V1 to circuit point 132, the diode being oriented for positive current conduction toward circuit point 132. A resistor 140 couples circuit point 132 to ground.

The output of amplifier 120 is coupled through resistor 142 to the collector of a PNP transistor 144. The emitter and base of that transistor are coupled together through a resistor 146, the emitter also being coupled to first positive voltage supply V1 and the base also being coupled to the emitter of an NPN transistor 148 through a resistor 150. The emitter of transistor 148 is connected to ground. The base of that transistor is coupled to a circuit point 152 through a resistor 154 and to a circuit point 156 through a resistor 158. Circuit point 152 may be coupled either to first positive voltage supply V1 or ground through a means schematically represented as a single-pole-double-throw switch 160; circuit point 156 may be coupled either to first positive voltage supply V1 or ground through a means schematically represented as a single-pole-double-throw switch 162.

The means represented by switch 160 may actually be output 86 of load/dump flip-flop 80 in FIG. 3. It is such that a positive voltage is applied to circuit point 152 when flip-flop 80 is in the dump state and the tester is in the balance mode and circuit point 152 is placed at ground potential when flip-flop 80 is in the load state and the tester is in the read mode. The means represented by switch 162 may be part of a circuit for disabling the temperature correction circuit while the tester is being calibrated. It is such that circuit point 156 is normally at ground level but is placed at a positive voltage during calibration.

As will be apparent, operational amplifier 120 is used as a d.c. differential operational amplifier. Resistor 128 is the feedback element, and its value, in combination with the amplifier input resistances, determines the gain through the amplifier. Capacitor 130 is included in the feedback network to aid in stabilizing the operation of the amplifier and reduce its gain at high frequencies, thus reducing the effect of noise. The network including resistors 134, 136, and 140 and diode 138 is operative to produce a d.c. offset at the amplifier output. The variation in the resistance of diode 138 with temperature is used to compensate for the voltages generated at the dissimilar metallic junctions used to connect thermistor 40 into the remainder of the temperature correction circuit. Variable resistor 126 may be used to calibrate the temperature correction circuit and adjust the output of amplifier 120 to a predetermined value when thermocouple 40 is at a known temperature.

When circuit points 152 and 156 are at ground level, the collector-emitter circuit of transistor 148 is relatively nonconductive. Thus, the collector-emitter circuit of transistor 144 is also nonconductive and a signal appears at output terminal 102 proportional to the output of amplifier 120. When either of circuit points 152 or 156 is made positive, as would occur when the tester is in the balance mode or is being calibrated, the emitter-base junction of transistor 148 is forward biased causing the emitter-collector circuit of that transistor to be conductive. Sufficient current then flows through resistor 150 to forward bias the emitter-base junction of transistor 144, making the emitter-collector circuit of that transistor conductive and causing output terminal 102 to be held at the voltage level of source V1, effectively disabling the correction circuit.

The output of amplifier 120 is coupled through the series combination of a resistor 170 and a capacitor 172 to the negative input of a differential operational amplifier 174. Capacitor 172 and the relatively low input impedance to the negative input of amplifier 174 combine to form a differentiating circuit. The positive input of amplifier 174 is coupled through resistor 176 to first positive voltage supply V1. The output of amplifier 174 is coupled to its negative input through a feedback path comprising the parallel combination of resistor 178 and capacitor 180, these components performing functions similar to those of the corresponding components associated with amplifier 120. The output of operational amplifier 174 is also coupled to both circuit points 182 and 184 through diodes 186 and 188, respectively, diodes 186 and 188 being oriented for high positive conductivity toward and away from the amplifier output, respectively. Circuit points 182 and 184 are coupled to first positive voltage supply V1 through diodes 190 and 192, respectively, diodes 190 and 192 being oriented for high positive conductivity toward and away from the positive voltage supply, respectively. Diodes 186, 188, 190, and 192 thus form a conventional full-wave rectifier having its output between circuit points 182 and 184. An alternative full-wave rectifier circuit using two PNP transistors having their collectors coupled to ground through a common load resistor, the base of the first and the emitter of the second coupled to the output of amplifier 174, and the emitter of the first and the base of the second coupled to first positive voltage supply V1, has been found useful.

A resistor 194 is connected between circuit points 182 and 184. Circuit point 184 is also coupled through resistor 196 to the base of an NPN transistor 198 having its emitter connected to circuit point 182 and its collector connected to a second positive voltage supply V2 of greater potential than first positive voltage supply V1 through a resistor 200. Transistor 198 and its associated circuit components amplify the output of the full-wave rectifier and perform the function of a driver.

When thermocouple 40 achieves a steady state condition, or changes at only a relatively slow rate, the output of amplifier 120 is relatively constant with time, a low level input signal is applied to the negative input of amplifier 174, and the output of amplifier 174 is held at approximately the potential of first positive supply V1. Thus, a relatively low level signal appears across circuit points 182 and 184, and insufficient forward bias is applied to the base-emitter junction of transistor 198 to cause the emitter-collector circuit of that transistor to conduct. The collector of transistor 198 remains at approximately the voltage of second positive voltage supply V2. When, however, the temperature sensed by thermocouple 40 is changing relatively rapidly, the output of amplifier 120 changes relatively rapidly and a relatively high level input signal is applied to the negative input of amplifier 174. The output of amplifier 174 will then depart from the voltage of the first positive voltage supply V1 by a relatively large amount, a relatively high level signal will appear across circuit points 182 and 184, and sufficient forward bias will be applied to the base-emitter junction of transistor 198 to cause the emitter-collector circuit of that transistor to conduct. The collector of transistor 198 thus will be at approximately the voltage of first positive voltage supply V1. If transistor 198 and its associated circuit elements are chosen so that a relatively small change in base-emitter current is required to change the emitter-collector circuit from a relatively non-conducting to a relatively heavily conducting state, the output at its collector will be essentially bimodal depending on the rate of change of the temperature sensed by thermocouple 40.

The collector of transistor 198 is coupled through a resistor 202 to the base of an NPN transistor 204. The base of that transistor is also coupled through the series combination of a capacitor 206 and a resistor 208 to a circuit point 210. Circuit point 210 may be coupled either to first positive voltage supply V1 or ground through a means schematically represented as a single-pole-double-throw switch 212. The means represented by switch 212 may actually be output 86 of load/dump flip-flop 80 in FIG. 3. As with switch 160, a positive voltage is applied to circuit point 210 when flip-flop 80 is in the dump state and the tester is in the balance mode and circuit point 210 is placed at ground potential when flip-flop 80 is in the load state and the tester is in the read mode.

The emitter of transistor 204 is connected to first positive voltage supply V1 and the collector is coupled to second positive voltage supply V2 through a resistor 214. Transistor 204 and its associated components perform the function of temperature gate circuit 92 of FIG. 3. The output is taken from a terminal point 216 coupled to the collector of transistor 204.

When the collector of transistor 198 is at the potential of the second positive voltage supply V2, as will occur when thermocouple 40 has achieved a relatively steady state condition, transistor 204 will be conductive and terminal point 216 will be at the potential of first positive voltage supply V1. When load/dump flip-flop 80 is changed from its dump to its load state, the potential at circuit point 210 will fall from that of first positive voltage supply V1 to ground and a negative going pulse will be applied to the base of transistor 204 of duration dependent upon the values of resistors 200, 202, 208 and capacitor 206. Transistor 204 will then be cut off and a positive going pulse will occur at terminal point 216. The negative going portion of that pulse, its trailing edge, may be used to trigger timer 58 in FIG. 3.

When the collector of transistor 198 is at the potential of the first positive voltage supply V1, as will occur when thermocouple 40 has not yet achieved a relatively steady state condition, transistor 204 will be nonconductive and the potential at terminal point 216 will be that of second positive voltage supply V2. A change in the potential from that of first positive voltage supply V1 to ground will, then, not cause a negative going level change to be emitted from terminal point 216. However, when the thermistor 40 reaches a relatively stable condition, the voltage at the collector of transistor 198 will change to that of second positive voltage supply V2 causing transistor 204 to become conductive and a negative going level change to occur at output terminal 216. That negative going level change is again used to trigger timer 58 of FIG. 3.

It will thus be seen that a moisture tester time delay circuit has been provided which delays the taking of a measurement related to a sensed condition for a period related to the differential between the value of the sensed condition and the initial condition of the sensing device. In particular, such a circuit has been provided which delays the taking of a measurement related to a sensed condition until the time rate of change of the output of the sensing device falls below a predetermined value. More particularly, a grain moisture tester having means to correct for variations in temperature of the grain under test wherein the taking of a measurement is delayed until the time rate of change of the output of a temperature responsive means falls below a predetermined value has been provided. However, it will be obvious that many modifications of the specific embodiment shown may be made without departing from the spirit and scope of this invention. For example, the time delay circuit shown could be used in many types of moisture testers. Moreover, the individual details of the circuit shown are subject to wide variation.

While a particular embodiment of this invention is disclosed above, it will be understood, of course, that the invention is not to be limited thereto since many modifications may be made. It is contemplated, therefore, by the appended claims to cover any such modifications as fall within the true spirit and scope of this invention.

I claim: determining
1. Apparatus for determine the moisture content of a quantity of grain placed within it and comprising:
   first means for taking a measurement of a first physical characteristic of said grain;
   second means for sensing a second physical characteristic of said grain;
   means coupled to said first and second means for altering said measurement in accord with an output of said second means; and
   means coupled to said first and second means for delaying the taking of said measurement for a period related to the differential between the value of the second physical characteristic of said grain and the initial condition of said second means before said grain is placed within said apparatus.

2. Apparatus for determining the moisture content of a quantity of grain placed within it and comprising:
   first means for taking a measurement of a physical characteristic of said grain;
   second means for sensing the temperature of said grain;
   means coupled to said first and second means for altering said measurement in accord with an output of said second means; and
   means coupled to said first and second means for delaying the taking of said measurement for a period related to the differential between the temperature of said grain and the temperature sensed by said second means before said grain is placed within said apparatus.

3. Apparatus for determining the moisture content of a quantity of grain under test comprising:
   first means for taking a measurement of a physical characteristic of said grain;
   second means for sensing the temperature of said grain;
   means coupled to said first and second means for altering said measurement in accord with an output of said second means; and
   means coupled to said first and second means for delaying the taking of said measurement until the time rate of change of an output of said second means falls below a predetermined value.

4. Apparatus for measuring the moisture content of a quantity of grain under test by determining the value of a physical characteristic of said grain having a known relationship to the grain moisture content wherein said relationship varies with the temperature of said grain comprising:
   first means for generating an output related to said physical characteristic;

second means for sensing the temperature of the grain under test;

third means coupled to said first and second means for altering said output in accord with an output of said second means; and fourth means coupled to said first and second means for time delaying the generation of said output until the rate of change of the output of said second means falls below a predetermined value.

5. The apparatus of claim 4 wherein said first means is operative in response to the application of a control signal and said fourth means comprises differentiating circuit means for generating a signal related to the time derivative of the output of said second means and control circuit means for preventing the application of said control signal to said first means when said derivative signal is above a predetermined value.

6. Apparatus for measuring the moisture content of a quantity of grain under test by determining the value of a physical characteristic of said grain having a known relationship to the grain moisture content wherein said relationship varies with the temperature of said grain comprising:

first means for generating an output related to said physical characteristic;

second means for sensing the temperature of the grain under test;

third means coupled to said first and second means for altering the response characteristics of said first means in accord with an output of said second means;

fourth means coupled to said first means for initiating the operation of said first means; and fifth means coupled to said second and fourth means for preventing the operation of said first means when the time rate of change of the output of said second means is above a predetermined value.

7. The apparatus of claim 6 wherein said fifth means comprises differentiating circuit means for generating a signal related to the time derivative of the output of said second means, full-wave rectifier circuit means for generating a signal related to the magnitude of said time derivative signal, and threshold circuit means for preventing the actuation of said first means by said fourth means when the output of said full-wave rectifier circuit means is greater than a predetermined magnitude.

8. A grain moisture tester comprising:

a capacitive cell for receiving a quantity of the grain under test;

an oscillator circuit having said capacitive cell as a frequency determining element thereof;

a frequency measuring circuit having an output related to the moisture content of said grain;

a temperature sensing element operative to sense the temperature of said quantity of grain and coupled to said frequency measuring circuit;

a differentiating circuit coupled to an output of said temperature sensing element;

a control circuit having an output coupled to said frequency measuring circuit and operative to initiate operation of said frequency measuring circuit; and a threshold circuit coupled between said control circuit and said differentiating circuit and preventing operation of said frequency measuring circuit when the output of said differentiating circuit exceeds a predetermined value.

9. The grain moisture tester of claim 8 further comprising a full-wave rectifier coupled to the output of said differentiating circuit and wherein said threshold circuit comprises a gate coupled to the output of said full-wave rectifier and interposed between said control circuit and said frequency measuring circuit.

10. The grain moisture tester of claim 9 wherein said control circuit comprises a manually operable circuit means operative to alter the signal present at said control circuit output.

* * * * *

UNITED STATES PATENT OFFICE
CERTIFICATE OF CORRECTION

Patent No. 3,743,930   Dated July 3, 1973

Inventor(s) GEORGE H. FATHAUER

It is certified that error appears in the above-identified patent and that said Letters Patent are hereby corrected as shown below:

Column 2, lines 44-45, "temperature" should be --measurement--;

Column 10, line 16, Delete "determining" after "I CLAIM:"; and

Claim 1, column 10, line 17, "determine" should be

-- determining --.

Signed and sealed this 7th day of May 1974.

(SEAL)
Attest:

EDWARD M.FLETCHER,JR.
Attesting Officer

C. MARSHALL DANN
Commissioner of Patents